No. 769,528. Patented September 6, 1904.

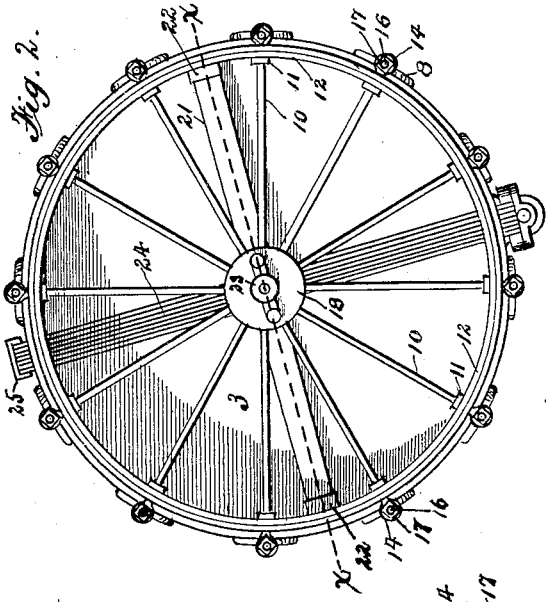

UNITED STATES PATENT OFFICE.

JOHN BAHR, OF PHILADELPHIA, PENNSYLVANIA.

DRUM.

SPECIFICATION forming part of Letters Patent No. 769,528, dated September 6, 1904.

Application filed April 23, 1904. Serial No. 204,604. (No model.)

*To all whom it may concern:*

Be it known that I, JOHN BAHR, a citizen of the United States, residing in the city of Philadelphia, in the county of Philadelphia and State of Pennsylvania, have invented certain new and useful Improvements in Drums, of which the following is a specification.

While my invention broadly relates to drums, it is yet confined more particularly to that class of such instruments known to the art as "snare-drums;" and such invention contemplates the provision of means whereby tension may be simultaneously imparted to heads arranged upon the opposite ends of a shell or body through the action of a single screw-threaded nut and connections extending between such nut and heads.

Further, the invention consists in the provision of peculiar means, hereinafter set forth, whereby tension of the drum head or heads at any particular part thereof may be increased or lessened when desired without interfering in any way with the remaining parts of said head or heads; and, finally, the invention consists in the construction, arrangement, and combination of the several parts comprised therein for service, substantially as is hereinafter set forth and, illustrated in the accompanying drawings, wherein—

Figure 1 is a top plan view of a drum embodying my improvements. Fig. 2 is a bottom plan view of the drum shown in Fig. 1. Fig. 3 is a side elevation of my improved drum. Fig. 4 is a transverse longitudinal section taken through the drum on the line *x x* of Fig. 2. Figs. 5 and 6 are enlarged detail views of parts of the drum to more clearly show the tension-controlling devices by which the desired degree of tension is imparted to the heads of said drum.

Similar numerals of reference in the several figures of the drawings denote similar parts.

In carrying my invention into practice I provide a shell 1, which may be made of any suitable material, upon its opposite ends with heads 2 and 3 and straining-hoops 4 and 5, to which the said heads are respectively connected. (See Figs. 4 and 6.) Upon the hoop 4 of one of said heads 2 I place a hoop 6 to receive the upper hooked ends 7 of V-shaped straining-links 8, which are connected by rods 9 with levers 10, which are fulcrumed upon supports 11, that are secured to the inner surface of a shell 12, which is preferably of greater diameter than the shell 1 and bears at its inner end upon the head-straining hoop 5, (see Fig. 5,) thus operating in practice as a straining-hoop to impart pressure to the head 3, as will be hereinafter set forth. I provide the shell 12, which may be constructed of any desired suitable material, with apertures 13, through which the outer ends of the radially-disposed levers 10 extend, as shown. I provide each of the levers 10 upon its outer end with an enlargement or head 14, apertured at 15 to receive the screw-threaded free end 16 of the rod 9, which extends therethrough. A nut 17 upon the screw-threaded portion of said rod 9 and bearing upon the outer side of the lever-head 14 operates to permit a greater or less degree of tension to the head at any desired point about the straining-hoop of the drum, as will be readily seen.

From the heads 14 the levers 10 extend inwardly to and above a plate or disk 18, which is centrally disposed as regards the shell 12 and is provided at its middle with an aperture to permit the passage of the outer screw-threaded free end of a rod 20, which projects from a bar 21, that extends from side to side of the shell 12 and is secured to said shell by clips 22, as shown. A thumb-nut 23 upon the rod 20 and bearing upon the plate or disk 18 operates to move the inner ends of the levers 10 simultaneously inward to increase tension of the heads 2 and 3 when desired.

Snares 24 extend from a fixed clamp 25, which is secured at one side to the straining-hoop 6 through openings 26, which are formed in the opposite sides of the shell 12 across and in contact with the head 3 to a movable clamp 27, which is moved by a screw-threaded rod 28, that turns in and is supported by a lug 29, secured to the straining-hoop 6, as shown. A head 30 on the screw-threaded rod 28 affords means whereby it may be turned to increase tension of the snares 24, as will be seen.

Guide-rods 31, which project from the bar 21 and enter sleeves 32, which project inwardly from the disk 18, operate to prevent said disk from movement when the thumb-nut 23 is turned to move the disk to or from the bar 21.

In operation pressure brought by the nut 23 and disk 18 upon the inner ends of the levers 10 will operate to simultaneously move the shell 12, upon which the levers are fulcrumed, and the hoop 6, to which said levers are connected by links, toward each other, and will thus impart tension to the drumheads through the movement of the straining-hoops 4 and 5, to which said heads are connected, as will be readily understood.

I deem the construction and arrangement of the shell 12 and its described connection with the straining-levers 10 and head-straining hoops 4, 5, and 6 to be of great importance, since I am thereby enabled to provide a double-headed drum with means whereby any desired degree of tension may be instantly imparted to the drumheads through the movement of a single lever-actuating device—to wit, the screw-threaded nut 23, which moves the disk 18 and lever ends thereunder.

Through the nuts 17 upon the links 9, which connect the levers 10 with the straining-hoops 6, the uniform tension of all parts of the drum-heads is insured, since said nuts 17 may be adjusted upon the rods or links to attain such end.

Modifications in detail of construction may be made in my herein-described invention without departing from the spirit or sacrificing the advantages of the same. I therefore claim the right to make any and all such modifications as shall properly fall within the scope and limit of such invention.

I claim and desire to secure by Letters Patent—

1. In a drum a cylindrical shell, a head upon each of the opposite ends of said shell, straining-hoops upon said shell connected to said heads, a series of radially-extending levers, connections between said levers and said straining-hoops, and mechanism to move said levers to simultaneously move said straining-hoops and impart tension to the drumheads, substantially as described.

2. In a drum a cylindrical head-supporting shell, a head upon each of the opposite ends of said shell, straining-hoops upon said shell connected to said heads, a tension-imparting hoop upon one end of said shell to bear upon the head-straining hoop thereon, a series of radially-extending levers to impart tension to the drumheads, a support for said levers to bear upon the opposite head-straining hoop of the head-supporting shell, connections between said levers and the tension-imparting hoop, and mechanism to move said levers to impart simultaneous movement to the head-straining hoops, substantially as described.

3. In a drum a cylindrical head-supporting shell, a head upon each of the opposite ends of said shell, straining-hoops upon said shell connected to said heads, snares in contact with one of the heads upon said shell, mechanism to give tension to said snares, a tension-imparting hoop upon one end of said shell to bear upon one of the head-straining hoops thereon, a series of levers to impart tension to the drumheads, a support for said levers to bear upon the remaining head-straining hoop, connections between the levers and the tension-imparting hoop, and a screw-actuated device to simultaneously actuate the levers to move the head-straining hoops and impart tension to the heads, substantially as described.

4. In a drum a head-supporting shell, a head upon each of the opposite ends of said shell, a straining-hoop connected to each of said heads, a tension-imparting hoop upon said shell and in contact with one of the head-straining hoops thereon, a series of radially-extending levers to impart tension to the drumheads, a support for said levers to bear upon the remaining head-straining hoop, adjustable connections between said levers and the tension-imparting hoop upon the head-supporting shell, a disk to bear upon the inner ends of the levers, and a screw-actuated device to move said disk and levers thereunder to impart tension to the drumheads, substantially as described.

5. In a drum a head-supporting shell, a head upon each of the opposite ends of said supporting-shell, a straining-hoop upon each end of said shell and connected to move the head thereon, a tension-imparting hoop upon one end of the head-supporting shell to bear upon the head-straining hoop thereon, a cylindrical shell to freely move upon the opposite end of said head-supporting shell and to bear upon one of the head-straining hoops thereon, a series of radially-extending levers fulcrumed upon said latter-named shell, independent adjustable connections between said levers and said tension-imparting hoop and a device to simultaneously move the inner ends of the levers and impart movement to the head-straining hoops, substantially as described.

In testimony whereof I hereunto affix my signature in presence of two witnesses.

JOHN BAHR.

Witnesses:
 WM. H. H. KNIGHT,
 EDGAR E. SHAFER.